(12) United States Patent
Kawano et al.

(10) Patent No.: US 8,534,260 B2
(45) Date of Patent: Sep. 17, 2013

(54) FUEL SUPPLY SYSTEM

(75) Inventors: Takanobu Kawano, Obu (JP); Toru Kosuda, Okazaki (JP); Yasuo Kato, Niwa-gun (JP); Fukuo Kitagawa, Nukata-gun (JP); Motomasa Iizuka, Anjo (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 325 days.

(21) Appl. No.: 13/027,600

(22) Filed: Feb. 15, 2011

(65) Prior Publication Data

US 2011/0197850 A1 Aug. 18, 2011

(30) Foreign Application Priority Data

Feb. 15, 2010 (JP) .................................. 2010-30325

(51) Int. Cl.
*F02M 25/08* (2006.01)
*F02M 37/00* (2006.01)

(52) U.S. Cl.
USPC ......................................... 123/298; 123/520

(58) Field of Classification Search
USPC ............ 123/298, 516, 518, 519, 520, 198 D, 123/557, 558, 431, 432, 308, 299, 300, 304
See application file for complete search history.

(56) References Cited

U.S. PATENT DOCUMENTS

| 3,765,382 | A | * | 10/1973 | Vandenberg | 123/557 |
| 3,945,352 | A | * | 3/1976 | Reimuller | 123/557 |
| 5,592,922 | A | * | 1/1997 | Denz | 123/520 |
| 6,378,489 | B1 | * | 4/2002 | Stanglmaier et al. | 123/304 |
| 2003/0200958 | A1 | * | 10/2003 | Ito et al. | 123/520 |

FOREIGN PATENT DOCUMENTS

| JP | 2003-343365 | 12/2003 |
| JP | 2007-239523 | 9/2007 |

* cited by examiner

*Primary Examiner* — Mahmoud Gimie
(74) *Attorney, Agent, or Firm* — Nixon & Vanderhye PC (57) ABSTRACT

A sub-injector injects liquid fuel into a vaporized-fuel chamber of a vaporized-fuel tank. The injected liquid fuel is vaporized in the vaporized-fuel chamber. The generated vaporized fuel is supplied to a combustion chamber through a vaporized-fuel passage. A supply of the vaporized fuel to the combustion chamber is controlled by a purge valve. Thereby, the vaporized fuel can be precisely supplied to the engine at a start of engine, so that emission can be reduced.

2 Claims, 8 Drawing Sheets

FUEL SUPPLY SYSTEM

CROSS-REFERENCE TO RELATED APPLICATION

This application is based on Japanese Patent Application No. 2010-30325 filed on Feb. 15, 2010, the disclosure of which is incorporated herein by reference.

FIELD OF THE INVENTION

The present invention relates to a fuel supply system which supplies vaporized fuel to an internal combustion engine.

BACKGROUND OF THE INVENTION

A fuel injector injects atomized fuel so that combustion efficiency is improved and incomplete combustion is avoided. In a case that engine temperature is relatively low, a part of the injected fuel is not vaporized and adheres on a wall of the internal combustion engine as unburned fuel. Due to this unburned fuel, unburned hydrocarbon (HC) and particulate matters (PM) are increased in exhaust gas.

JP-2007-239523A shows a vaporized fuel supply system in which fuel is heated to be adsorbed by a canister. When an engine is started, a purge vale is opened so that the adsorbed fuel is purged into an intake pipe, whereby combustion efficiency is improved and emission is reduced. Further, JP-2003-343365A shows a fuel supply system in which vaporized fuel in a fuel tank is injected by a sub-injector in order to improve combustion efficiency and to reduce emission.

However, in the fuel supply system shown in JP-2007-239523A, it takes long time period to purge the vaporized fuel from the canister. Thus, it is likely that the vaporized fuel can not be supplied to the engine when the engine is started. In the fuel supply system shown in JP-2003-343365A, a pump and a valve are necessary to supply the vaporized fuel from a fuel tank, which increases the number of parts and components. Further, in both fuel supply systems, since the concentration and the pressure of the vaporized fuel are not constant, it is relatively difficult to control the air-fuel ratio precisely.

SUMMARY OF THE INVENTION

The present invention is made in view of the above matters, and it is an object of the present invention to provide a fuel supply system which is able to properly supply vaporized fuel into an internal combustion engine.

According to the present invention, a fuel supply system is provided with a fuel tank, a pump, a first injector, a second injector, a vaporized-fuel tank, a vaporized-fuel pipe, a purge valve, and a control unit.

The fuel tank stores a liquid fuel therein. The pump supplies the liquid fuel stored in the fuel tank into the first injector and the second injector. The first injector injects the liquid fuel supplied from the pump into a combustion chamber or an intake passage of an internal combustion engine. The second injector injects the liquid fuel supplied from the pump into a vaporized-fuel chamber to generate a vaporized fuel therein. The vaporized-fuel tank defines a vaporized-fuel chamber for storing the vaporized fuel generated by an injection of the second injector. The vaporized-fuel pipe defines a vaporized-fuel passage which introduces the vaporized fuel stored in the vaporized-fuel tank into the intake passage. The purge valve is provided in the vaporized-fuel passage for selectively switching a communication between the vaporized-fuel chamber and the intake passage. The control unit includes a first injection control means, a second injection control means, and a purge vale control means. The first injection control means controls a fuel injection through the first injector. The second injection control means controls a fuel injection through the second injector. The purge valve control means controls an open/close position of the purge valve.

As described above, the second injector injects the liquid fuel into the vaporized-fuel chamber to generate vaporized fuel. The generated vaporized fuel is supplied to the combustion chamber through the vaporized-fuel passage. The supply of the vaporized fuel to the combustion chamber is controlled by the purge valve. Thereby, the vaporized fuel can be precisely supplied to the engine when the engine is started, so that emission can be reduced.

Further, after the second injector injects the liquid fuel into the vaporized-fuel chamber, the hydrocarbon of which molecular weight is small is vaporized so that the molecular number of gas is increased in the vaporized-fuel tank. The pressure in the vaporized-fuel chamber increases. At this moment, by opening the purge valve, the vaporized fuel in the vaporized-fuel chamber flows into the intake passage by a differential pressure between the vaporized-fuel chamber and the intake passage. Thus, an additional fuel pump is unnecessary to supply the vaporized fuel to the intake passage.

Furthermore, since the pressure in vaporized-fuel tank is kept higher than the atmospheric pressure, air is hardly mixed with the vaporized fuel. Thereby, oxidation degradation of the vaporized fuel can be avoided. Further, since the vaporized-fuel tank is mostly filled with the vaporized fuel, the concentration of the vaporized fuel which will be supplied to the internal combustion engine is easily controlled.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

Embodiments of the present invention will be described hereinafter.

[First Embodiment]

Figure 1:
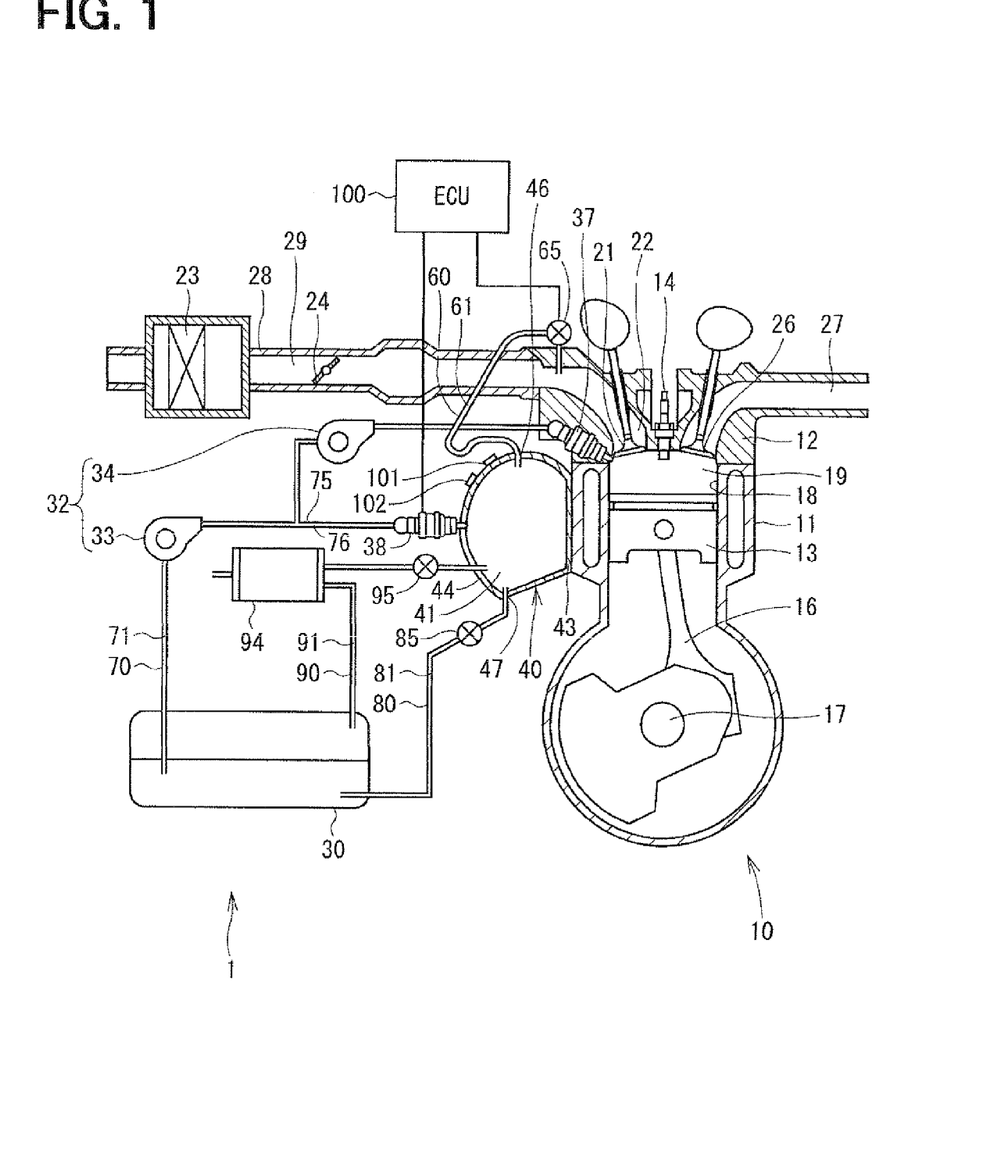
FIG. 1 is a construction diagram to show a construction of a fuel supply system according to a first embodiment of the present invention.

FIG. 1 is a schematic view showing a fuel supply system 1 according to a first embodiment. The fuel supply system 1 is applied to a four-cylinder direct injection gasoline engine 10. This engine 10 is mounted on a vehicle having an idle reduction control function. In FIG. 1, only one of cylinders is illustrated.

The engine 10 is comprised of a cylinder block 11, a cylinder head 12, a piston 13, a spark plug 14 and the like. In the present embodiment, the cylinder block 11 and the cylinder head 12 correspond to an engine block. The cylinder block 11 has a cylinder 18 in which a piston 13 is slidably accommodated. The piston 13 is connected with a crankshaft 17 through a connecting rod 16.

An intake port 22 and an exhaust port 27 are formed on the cylinder head 12. The intake port 22 communicates with an intake passage 29 defined by an intake pipe 28. It should be noted that the intake port 22 and the intake passage 29 correspond to "intake passage" of the present invention. An intake valve 21 opens and closes communication between the intake port 22 and a combustion chamber 19. An exhaust valve 26 opens and closes communication between the exhaust port 27 and the combustion chamber 19. The combustion chamber 19 is defined by the cylinder 18, the cylinder head 12, the piston 13, the intake valve 21 and the exhaust valve 26. The intake pipe 28 is provided with an air cleaner 23 and a throttle valve 24. The air cleaner 23 removes foreign matters from intake air which will be introduced into the combustion chamber 19. The throttle valve 24 adjusts an intake air flow rate. A spark plug 14 generates sparks to ignite air-fuel mixture in the combustion chamber 19 according to command signals from an electronic control unit (ECU) 100.

The fuel supply system 1 is comprised of a fuel tank 30, a fuel pump 32, a main injector (first injector) 37, a sub-injector (second injector) 38, a vaporized-fuel tank 40, a vaporized-fuel pipe 60, a purge valve 65, a return pipe 80, a canister 94, and the ECU 100.

The fuel tank 30 stores fuel (gasoline) therein. The fuel pump 32 is comprised of a low-pressure pump 33 and a high-pressure pump 34. The low-pressure pump 33 pumps up the fuel from the fuel tank 30 and supplies the fuel to the high-pressure pump 34 through a fuel passage 71 defined by a fuel pipe 70. The high-pressure pump 34 pressurizes the fuel and supplies the fuel to the main injector 37. The main injector 37 injects the pressurized fuel into the combustion chamber 19.

A branch pipe 75 is branched from the fuel pipe 70 between the low-pressure pump 33 and the high-pressure pump 34. The pipe 75 defines a branch passage 76 communicating with the fuel passage 71. A pad of the liquid fuel supplied from the low-pressure pump 33 is introduced into the sub-injector 38 through the branch passage 76. That is, the sub-injector 38 receives the fuel of which pressure is lower than that of the fuel supplied to the main injector 37. The sub-injector 38 injects the low-pressure fuel into a vaporized-fuel chamber 41 of the vaporized-fuel tank 40.

The vaporized-fuel tank 40 is a pressure tight tank having a contacting wall 43 which is in contact with an outer wall surface of the cylinder block 11. Thereby, the vaporized-fuel tank 40 receives heat from the cylinder block 11 of which temperature is increased by fuel combustion in the combustion chamber 19. The sub-injector 38 is mounted to a side wall 44 of the vaporized-fuel tank 40, which is opposed to the contacting wall 43. The sub-injector 38 injects the liquid fuel toward the contacting wall 43. The liquid fuel injected through the sub-injector 38 is vaporized in the vaporized-fuel chamber 41, which is heated by the cylinder block 11. It should be noted that the contacting wall 43 corresponds to "contact position" of the present invention.

The vaporized-fuel pipe 60 defines a vaporized-fuel passage 61 which connects the vaporized-fuel chamber 41 and the intake port 22. The purge valve 65 is provided in the vaporized-fuel passage 61 so as to open and close communication between the vaporized fuel chamber 41 and the intake port 22. When the purge valve 65 is opened, the vaporized fuel in the vaporized-fuel chamber 41 is supplied to the combustion chamber 19 through the intake port 22 and the intake valve 21. A connecting end portion 46 of the vaporized-fuel pipe 60 extends vertically downward and is connected to a vertically upper wall of the vaporized-fuel tank 40 in a vertical direction.

If the vaporized-fuel passage 61 is relatively long, it takes long time period for the vaporized fuel to be supplied from the vaporized-fuel tank 40 to the intake port 22. Thus, it is preferable that the vaporized-fuel passage 61 is short as much as possible.

The return pipe 80 defines a return passage 81 which connects the vaporized-fuel chamber 41 and the fuel tank 30. A relief valve 85 is provided in the return passage 81. The relief valve 85 is an electromagnetic valve which is controlled by the ECU 100. When the relief valve 85 is opened, the fuel in the vaporized-fuel tank 40 is returned to the fuel tank 30. A connecting end portion 47 of the return pipe 80 extends vertically upward and is connected to a vertically lower wall of the vaporized-fuel tank 40 in a vertical direction.

An evaporated-fuel pipe 90 defines an evaporated-fuel passage 91 which connects the vaporized fuel chamber 41 and the fuel tank 30. The evaporated-fuel pipe 90 is connected to a canister 94. The canister 94 has adsorbent, such as activated carbon, therein. The vaporized fuel generated in the fuel tank 30 and discharged from the vaporized-fuel chamber 41 is adsorbed by the canister 94. A canister valve 95 is provided between the canister 94 and the vaporized-fuel tank 40.

The ECU 100 is comprised of a microcomputer having a CPU, a memory, an input circuit, an output circuit, a power supply circuit and the like. The ECU 100 receives detection signals from various sensors, such as an accelerator position sensor and an engine speed sensor. Further, the ECU 100 receives a detection signal from a temperature sensor 101 which detects temperature in the vaporized-fuel chamber 41. Still further, the ECU 100 receives a detection signal from a pressure sensor 102 which detects pressure in the vaporized-fuel chamber 41. Based on these detection signals, the ECU 100 controls the fuel injection through the main injector 37 and the sub-injector 38, the purge valve 65, the relief valve 85, the canister valve 95 and the like.

Figure 2:
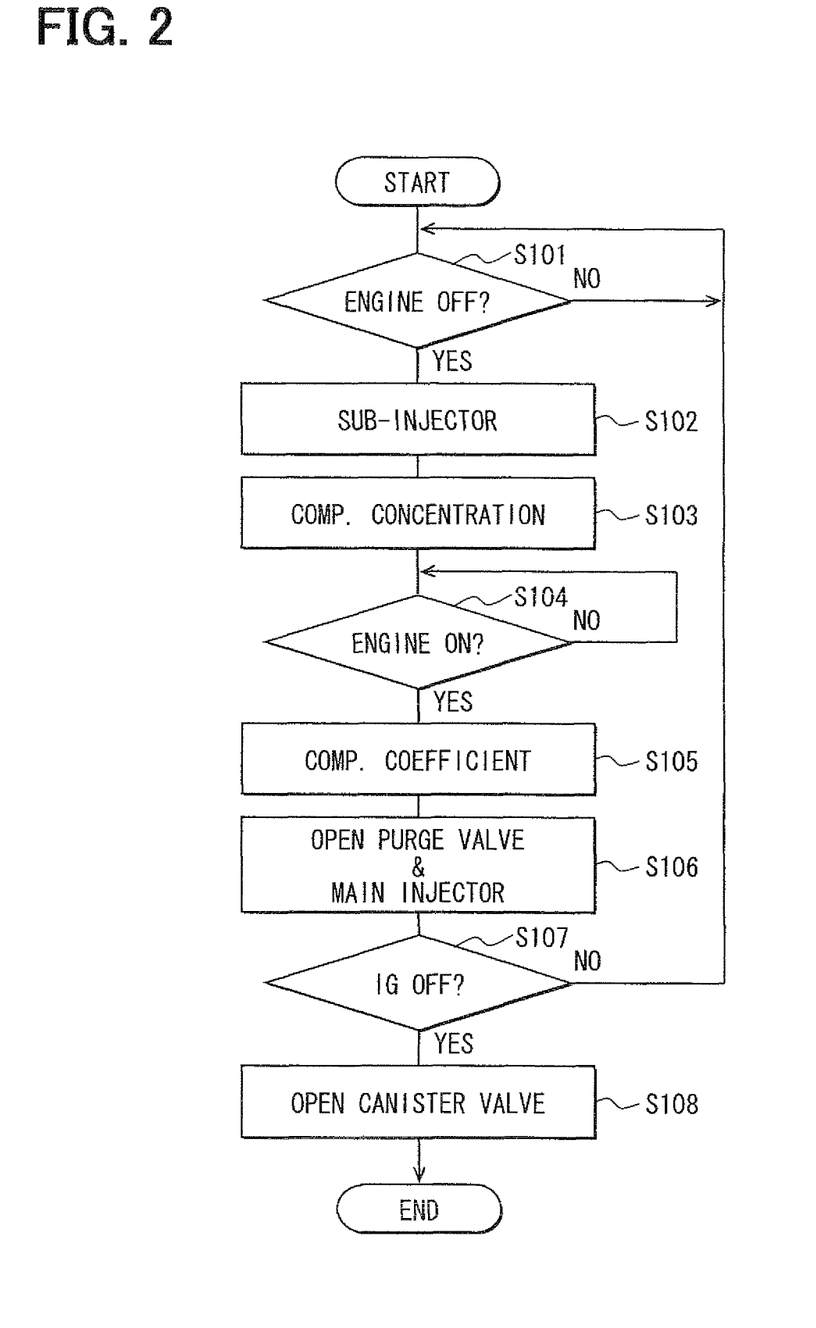
FIG. 2 is a flowchart showing a vaporized fuel supply control according to the first embodiment.
Figure 3:
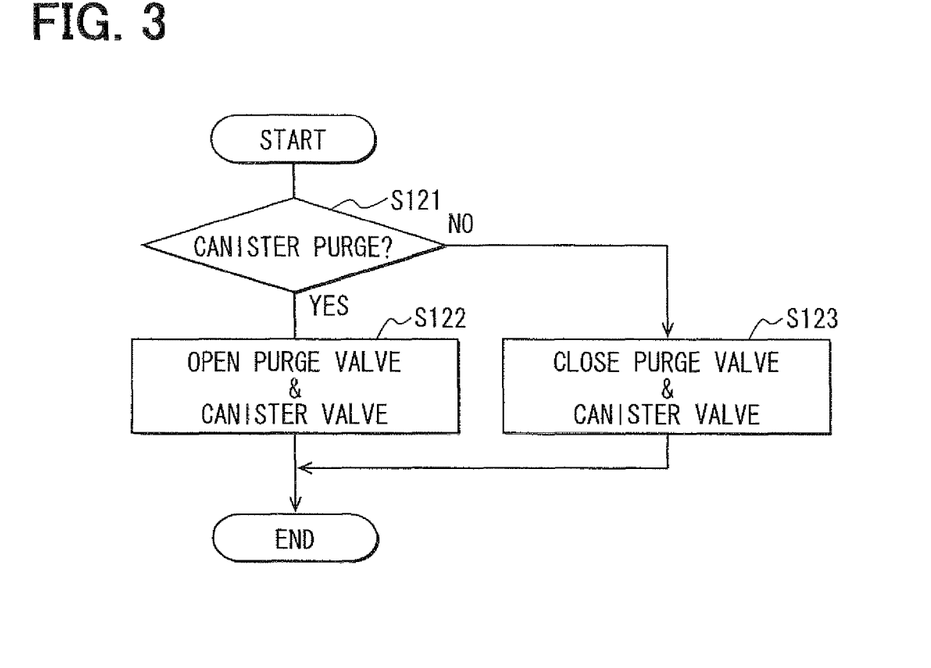
FIG. 3 is a flowchart showing a purge valve control according to the first embodiment.
Figure 4:
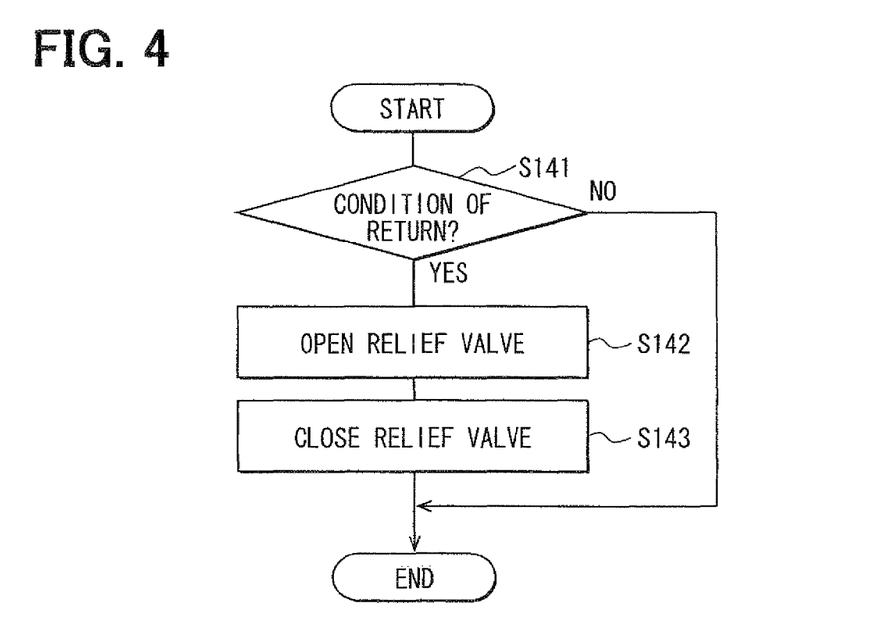
FIG. 4 is a flowchart showing a liquid fuel discharge control according to the first embodiment.

Referring to FIGS. 2 to 4, a control processing of the fuel supply system 1 will be described hereinafter. FIG. 2 is a flowchart showing a main flow which is executed when an ignition switch is turned on.

In step S101, the computer determines whether the engine 10 is shut off. When the engine 10 is not shut off, that is, when the answer is NO, the process in step S101 is repeated. When the engine 10 is shut off, that is, when the answer is YES, the procedure proceeds to step S102. In the present embodiment, the vehicle has a function of idle reduction control. Thus, during the idle reduction control, the answer is YES in step S101.

In S102, the sub-injector 38 injects liquid fuel into the vaporized-fuel chamber 41 to generate vaporized fuel. In S103, the computer computes a concentration of the vaporized fuel in the vaporized-fuel chamber 41 based on the temperature and the pressure detected by the temperature sensor 101 and the pressure sensor 102. It is assumed that the vaporized fuel is saturated in the vaporized-fuel chamber 41 when the concentration in the chamber 41 is computed.

In step S104, the computer determines whether the engine 10 is started. When the answer is NO, this process is repeated. When the answer is YES, the procedure proceeds to step S105.

In S105, the computer estimates a vaporized fuel quantity supplied to the combustion chamber 19 based on the concentration of the vaporized fuel in the vaporized-fuel chamber 41, which is computed in step S103. Based on the estimated vaporized fuel quantity, the computer computes a reduction coefficient for reducing the fuel injection quantity through the main injector 37 so that the air-fuel ratio in the combustion chamber 19 becomes the stoichiometric air-fuel ratio.

In S106, the main injector 37 injects the fuel into the combustion chamber 19, of which quantity is reduced based on the reduction coefficient computed in step S105. Further, the purge vale 65 is opened. Since the vaporized-fuel tank 40 is in contact with the cylinder block 11, the vaporized-fuel tank 40 receives heat from the cylinder block 11 when the answer is YES in step S101 due to an idle reduction control. The liquid fuel injected into the vaporized-fuel chamber 41 through the sub-injector 38, especially, hydrocarbon (HC) of which carbon number is less than "5" is vaporized, whereby the pressure in the vaporized-fuel chamber 41 becomes lower than that in the intake port 22. Thus, when the purge valve 65 is opened, the vaporized fuel in the vaporized-fuel chamber 41 flows into the intake port 22 by a differential pressure between the vaporized-fuel chamber 41 and the intake port 22 without an additional fuel pump. Then, when the intake valve 21 is opened, the vaporized fuel flows into the combustion chamber 19 with the intake air.

The purge valve 65 is closed after a specified time period has passed, which corresponds to a specified number of combustion. That is, after the specified number (for example, eight) of fuel combustion are conducted, the main injector 37 starts to inject the fuel into the combustion chamber 19. After the purge valve 65 is closed, the main injector 37 injects the fuel of normal quantity without reduction. It should be noted that the above specified number of combustion depends on volume of the vaporized-fuel tank 40. That is, until all of the vaporized fuel in the vaporized-fuel tank 40 is consumed, the purge valve 65 is opened. The purge valve 65 may be provided to each of cylinder to improve the air-fuel ratio control.

In step S107, it is determined whether the ignition switch (IG) is turned off. When it is determined that ignition is not turned off (S107: NO), it returns to S101. When the answer is YES in step S107, the procedure proceeds to step S108.

In step S108, the canister valve 95 is opened and the vaporized fuel in the vaporized-fuel chamber 41 is adsorbed by the canister 94.

FIG. 3 is a flowchart for explaining a canister purge control in which the vaporized fuel is supplied from the canister 94 to the intake port 22. This processing is executed at a specified interval while the ignition switch is ON.

In step S121, the computer determines whether it is a condition where a canister purge can be conducted. In the present embodiment, the computer determines that the canister purge condition is established when the engine coolant temperature is greater than a specified value and a predetermined engine torque is generated. When the answer is YES in step S121, the procedure proceeds to step S122 in which the purge valve 65 and the canister valve 95 are opened. When the answer is NO, the procedure proceeds to step S123 in which the purge valve 65 and the canister valve 95 are closed.

FIG. 4 is a flowchart showing a control in which the liquid fuel remaining in the vaporized-fuel tank 40 is discharged. It is preferable that this processing is executed when the ignition switch is turned off. Even during an engine driving, if the liquid fuel is needed to be discharged from the vaporized-fuel tank 40, this processing is executed.

In step S141, the computer determines whether it is in a condition where the fuel in the vaporized-fuel tank 40 can be returned to the fuel tank 30. For example, when the pressure in the fuel tank 30 is lower than the pressure in the vaporized-fuel tank 40, the condition is established. When the answer is NO in step S141, this processing is terminated. When the answer is YES, the procedure proceeds to step S142.

In step S142, the relief valve 85 is opened and time check is started. In step S143, after a specified time period has passed from an opening of the relief valve 85, the relief valve 85 is closed.

As described above, according to the present embodiment, the sub-injector 38 injects the liquid fuel into the vaporized-fuel chamber 41 to generate vaporized fuel. The generated vaporized fuel is supplied to the combustion chamber 19 through the vaporized-fuel passage 61. The supply of the vaporized fuel to the combustion chamber 19 is controlled by the purge valve 65. Thereby, the vaporized fuel can be precisely supplied to the engine at a start of engine, so that the emission can be reduced.

Further, after the sub-injector 38 injects the liquid fuel into the vaporized-fuel chamber 41, the hydrocarbon of which molecular weight is small is vaporized so that the molecular number of gas is increased in the vaporized-fuel tank 40. The pressure in the vaporized-fuel chamber 41 increases. At this moment, by opening the purge valve 65, the vaporized fuel in the vaporized-fuel chamber 41 flows into the intake port 22 by a differential pressure between the vaporized-fuel chamber 41 and the intake port 22. Thus, an additional pump is unnecessary to supply the vaporized fuel to the intake port 22.

According to the present embodiment, the fuel pump 32 is comprised of a low-pressure pump 33 and a high-pressure pump 34. The main injector 37 receives high-pressure fuel from the high-pressure pump 34, and the sub-injector 38 receives low-pressure fuel through the branch passage 76 which is branched between the low-pressure pump 33 and the high-pressure pump 34. Thus, it is unnecessary to provide a pump supplying vaporized fuel of large volume.

Furthermore, since the pressure in vaporized-fuel tank 40 is kept higher than the atmospheric pressure, air is hardly mixed with the vaporized fuel. Thereby, no deposit is generated due to oxidation degradation of the vaporized fuel. Further, since the vaporized-fuel tank 40 is mostly filled with the vaporized fuel, the concentration of the vaporized fuel which will be supplied to the combustion chamber 19 is easily controlled.

The ECU 100 receives detection signals from the temperature sensor 101 which detects temperature in the vaporized-fuel chamber 41. Further, the ECU 100 receives detection signals from the pressure sensor 102 which detects pressure in the vaporized-fuel chamber 41. Based on these detection signals, the concentration of the vaporized fuel in the vaporized-fuel chamber 41 can be estimated. Besides, the accuracy of the distillation of the vaporized fuel can be improved. Thereby, the vaporized fuel can be supplied to the combustion chamber 19 with high accuracy.

The vaporized-fuel tank 40 is in contact with the cylinder block 11 and receives heat therefrom. Thus, the vaporization of the fuel in the vaporized-fuel tank 40 can be facilitated. Further, the sub-injector 38 injects the fuel toward the contacting wall 43 of the vaporized-fuel tank 40. Thus, the injected liquid fuel is efficiently vaporized. Furthermore, since the heat of the engine 10 is transferred to the vaporized-fuel tank 40, the cooling of the engine 10 can be promoted.

According to the above embodiment, the return pipe 80 defining the return passage 81 is provided in order to return the fuel in the vaporized-fuel chamber 41 to the fuel tank 30. Further, the relief valve 85 is provided in the return passage 81 in order to open and close a communication between the vaporized-fuel tank 40 and the fuel tank 30. The ECU 100 controls the relief valve 85. Thus, the liquid fuel remaining in the vaporized-fuel tank 40 can be properly discharged therefrom.

The connecting end portion 47 of the return pipe 80 is connected to the vertically lower wall of the vaporized-fuel tank 40 in a vertical direction. Thereby, the not-vaporized liquid fuel can be efficiently returned to the fuel tank 30. Furthermore, the connecting end portion 46 of the pipe 60 is connected to the vertically upper wall of the vaporized-fuel tank 40 in a vertical direction. Thereby, the vaporized fuel of which specific gravity is small can be efficiently introduced into the vaporized-fuel passage 61.

The canister 94 is arranged in the passage 91 connecting the fuel tank 30 and the vaporized-fuel tank 40. The canister valve 95 is provided between the canister 94 and the vaporized-fuel tank 40. Thereby, the adsorbed vaporized fuel can be purged into the vaporized-fuel chamber 41 as required and the concentration of the vaporized fuel in the vaporized-fuel chamber 41 is made higher before the sub-injector 38 injects the vaporized fuel.

The ECU 100 executes the above processing so that following advantage can be obtained.

When the computer determines that the engine 10 is off (S101: YES), the sub-injector 38 injects the liquid fuel into the vaporized-fuel chamber 41 (S102). When the idle reduction control is executed, the temperature of the cylinder block 11 is relatively high. By use of this heat quantity, the vaporized-fuel chamber 41 is heated to facilitate the vaporization of the liquid fuel injected through the sub-injector 38. The vaporized-fuel chamber 41 can accumulate high concentration vaporized fuel therein.

When the computer determines that the engine 10 is started (S104: YES), the purge valve 65 is opened for a specified period and then closed (S106). Thereby, the vaporized fuel can be supplied from the vaporized-fuel chamber 41 to the combustion chamber 19 at a start of engine, so that the emission can be reduced. According to the present embodiment, the vehicle is provided with an idle reduction function in which the engine stop and the engine restart are repeated. During the idle reduction, the temperature of the cylinder block is high. The vaporized-fuel tank 40 receives heat from the cylinder block 11 so that the liquid fuel is efficiently vaporized. This vaporized fuel is supplied to the engine when the engine 10 is restarted. Thereby, even when the idle reduction control is repeatedly conducted, the emission can be reduced.

The concentration of the vaporized fuel in the vaporized-fuel chamber 41 is computed (S103), and the computer estimates the vaporized fuel quantity supplied to the combustion chamber 19 based on the concentration of the vaporized fuel. Based on the estimated vaporized fuel quantity, the computer computes a reduction coefficient for reducing the fuel injection quantity through the main injector 37 (S105). The main injector 37 injects the reduced fuel into the combustion chamber 19 (S106). Thereby, the air-fuel ratio in the combustion chamber 19 can be properly controlled.

It should be noted that step S106 corresponds to a first injection control means, step S102 corresponds to a second injection control means, step S106 corresponds to a purge valve control means, step S103 corresponds to a concentration computing means, and step S105 corresponds to a reduction coefficient computing means. Further, steps S142 and S143 correspond to a relief valve control means.

[Second Embodiment]

Figure 5:
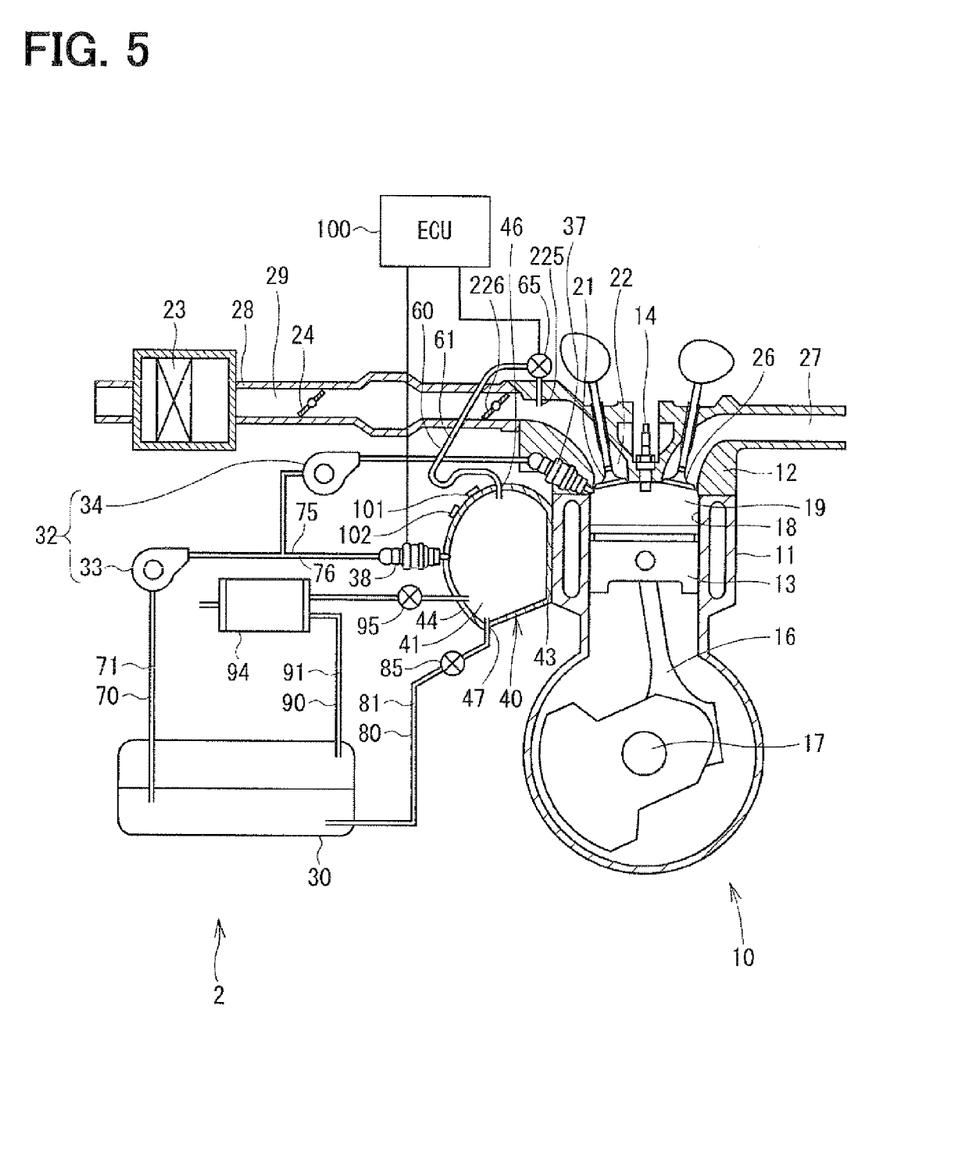
FIG. 5 is a construction diagram to show a construction of a fuel supply system according to a second embodiment of the present invention.

Referring to FIG. 5, a second embodiment of the present invention will be described hereinafter. In each of following embodiments, the substantially same parts and the components are indicated with the same reference numeral and the same description will not be reiterated.

As shown in FIG. 5, a fuel supply system 2 is provided with an intake control valve 226 in the intake passage 29 upstream of the vaporized-fuel introducing portion 225. When the intake control valve 226 is closed, the passage space downstream of the intake control valve 226 becomes a closed space. When the intake valve 21 is opened in the suction stroke, the pressure in the closed space becomes lower than that in the vaporized-fuel chamber 41. Thereby, the vaporized fuel in the vaporized-fuel chamber 41 can be easily introduced into the intake port 22.

[Third Embodiment]

Figure 6:
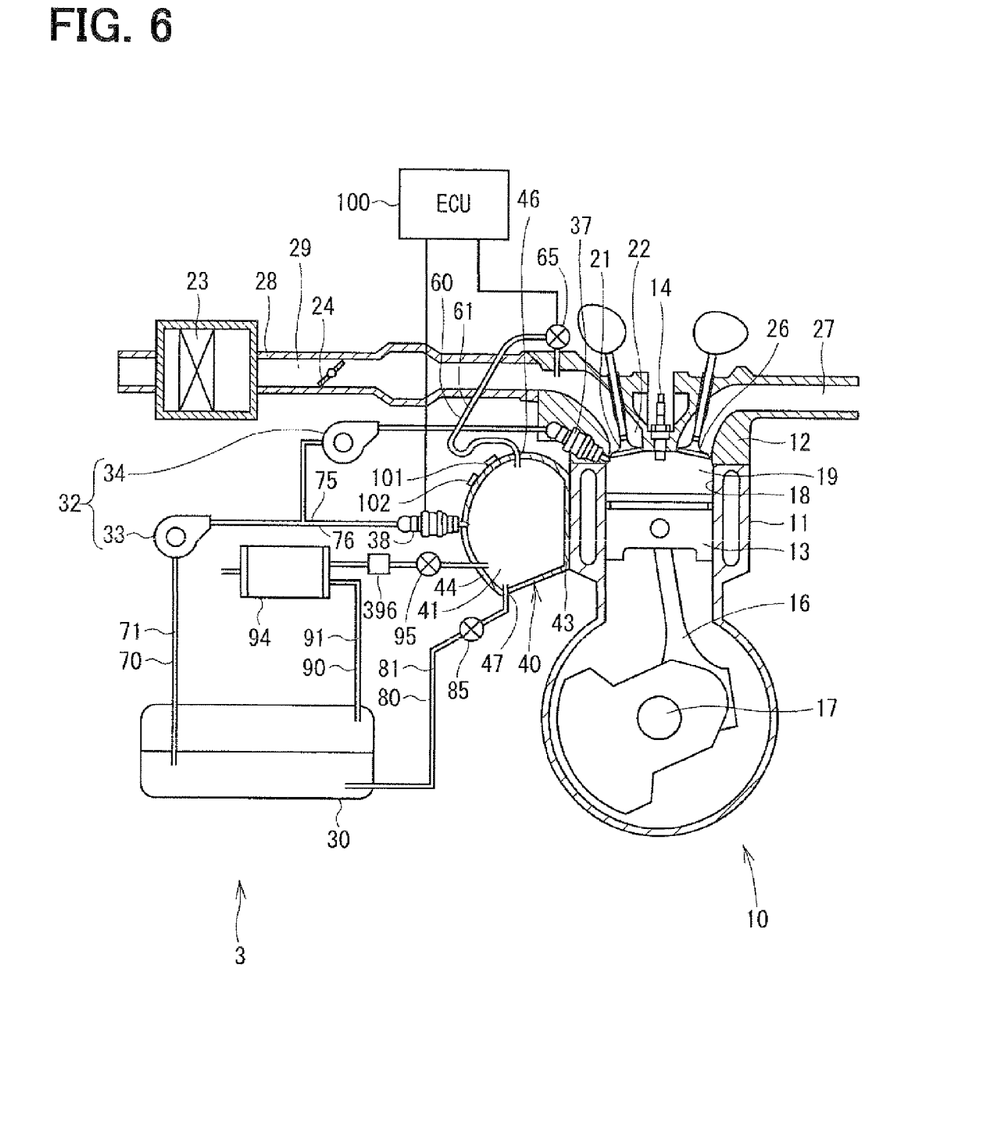
FIG. 6 is a construction diagram to show a construction of a fuel supply system according to a third embodiment of the present invention.

Referring to FIG. 6, a third embodiment of the fuel supply system will be described hereinafter.

As shown in FIG. 6, the fuel supply system 3 is provided with a pump 396. When the pressure in the vaporized-fuel chamber 41 is insufficient, the pump 396 pressurizes the vaporized fuel purged from the canister 94. The pressurized vaporized fuel is supplied to the vaporized-fuel chamber 41 to increase the pressure therein.

[Fourth Embodiment]

Figure 7:
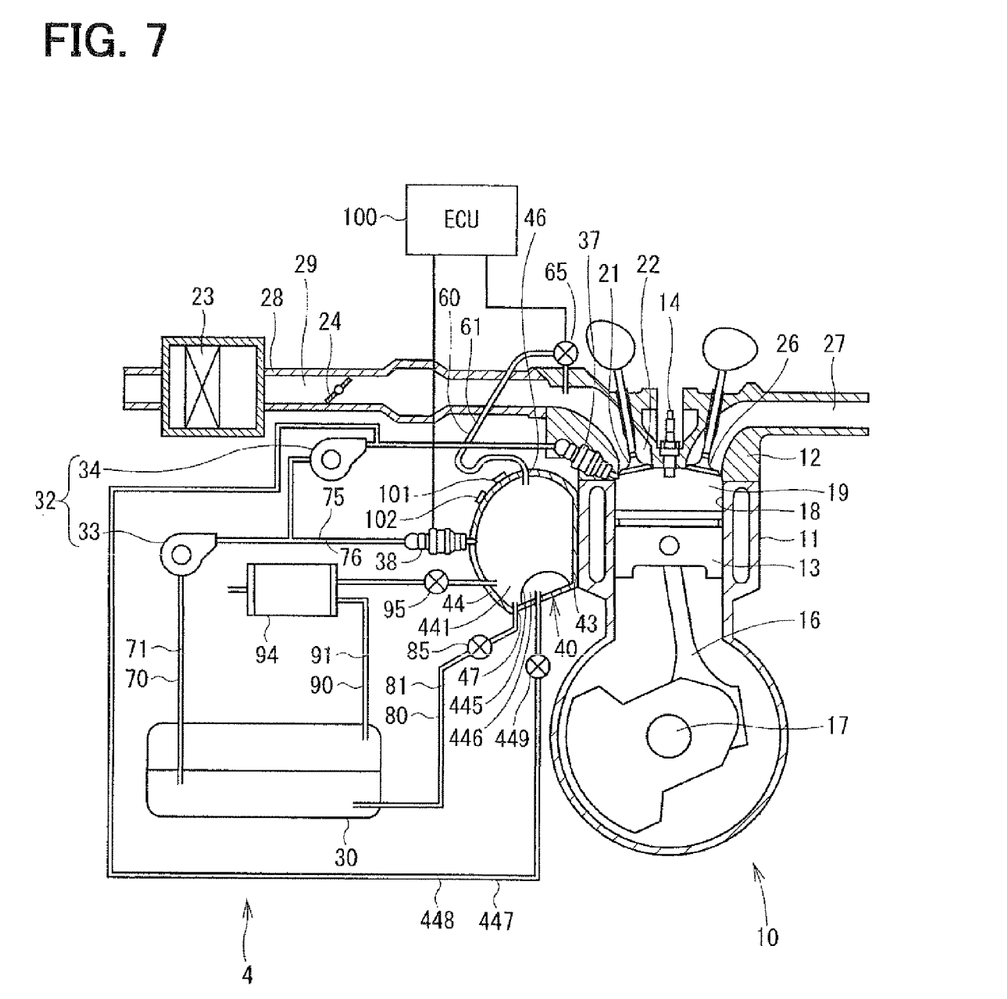
FIG. 7 is a construction diagram to show a construction of a fuel supply system according to a fourth embodiment of the present invention.

Referring to FIG. 7, a fourth embodiment of the present invention will be described hereinafter. As shown in FIG. 7, a fuel supply system 4 is provided with a vaporized-fuel tank 40 having a partition 445 therein. The partition 445 is made of elastic material, such as rubber. A high-pressure fuel chamber 446 is defined between the inner wall of the vaporized-fuel tank 40 and the partition 445. It is preferable that the high-pressure fuel chamber 446 does not overlap the contacting wall 43.

Further, the fuel supply system 4 is provided with a high-pressure fuel pipe 447 defining a high-pressure fuel passage 448. The high-pressure fuel passage 448 connects the downstream of the high-pressure pump 34 and the high-pressure fuel chamber 446. Thereby, the high-pressure fuel pressurized by the high-pressure pump 34 is supplied to the high-pressure fuel chamber 446. A switching valve 449 is provided in the high-pressure fuel passage 448 for opening and closing communication between the high-pressure pump 34 and the high-pressure fuel chamber 446.

When the pressure in the vaporized-fuel tank 40 is insufficient, the switching valve 449 is opened, so that the high-pressure fuel is introduced into the high-pressure fuel chamber 446. Since the partition 445 is made of elastic material, the high-pressure fuel chamber 446 expands receiving the high-pressure fuel therein. The volume of the high-pressure fuel chamber 446 in the vaporized-fuel tank 40 is increased. The volume of the vaporized-fuel chamber 441 is reduced, so that the pressure in the vaporized-fuel chamber 441 is further increased.

[Fifth Embodiment]

Figure 8:
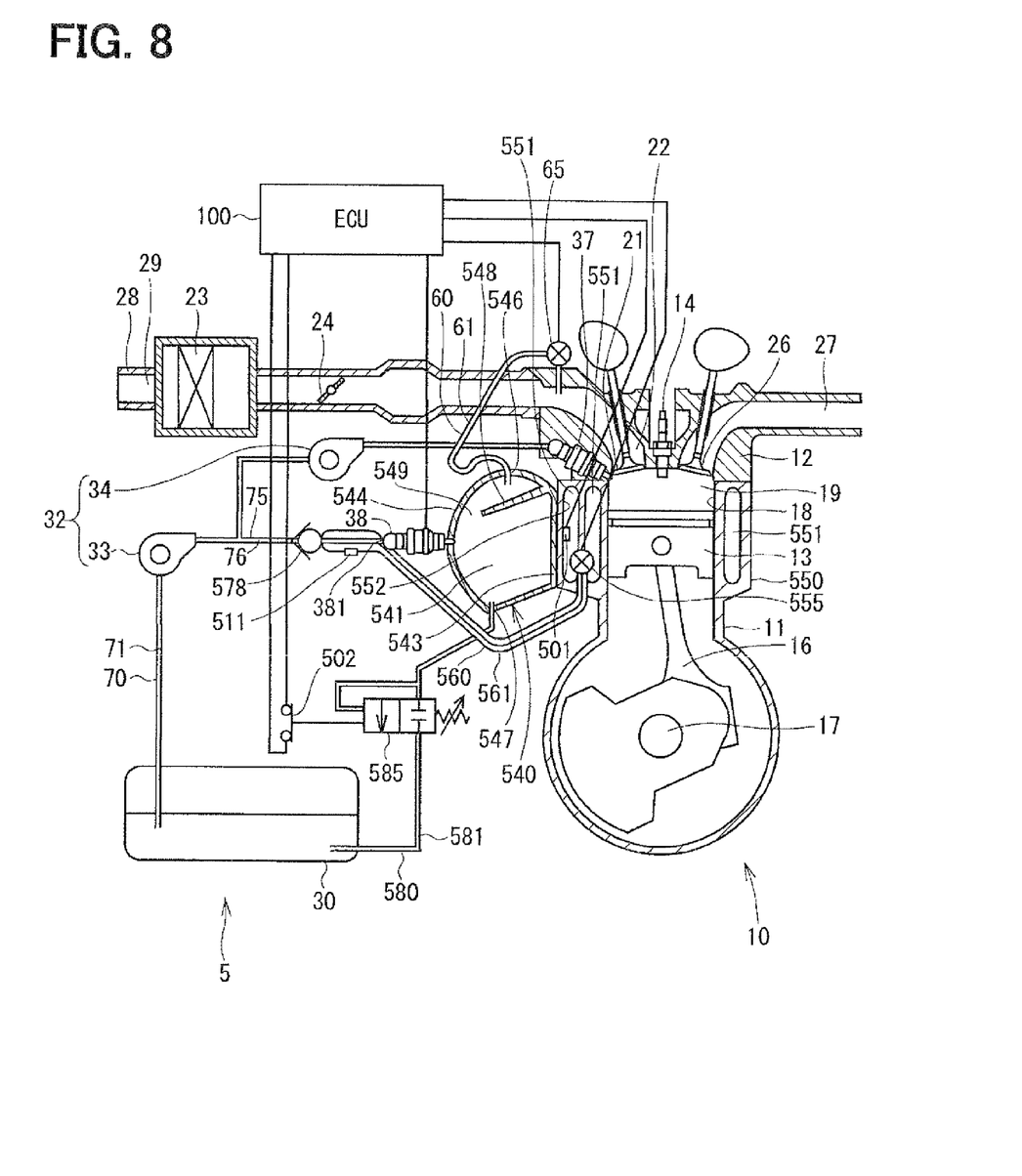
FIG. 8 is a construction diagram to show a construction of a fuel supply system according to a fifth embodiment of the present invention.

Referring to FIG. 8, a fifth embodiment of the present invention will be described hereinafter. As shown in FIG. 8, a fuel supply system 5 is provided with a heat exchanging portion 550 on the cylinder block 11. A heat exchanging chamber 551 is defined in the heat exchanging portion 550. Engine coolant is circulated in the heat exchanging chamber 551.

The vaporized-fuel tank 540 is in contact with the heat exchanging portion 550 through the contacting wall 543. Thereby, the vaporized-fuel tank 540 receives heat from the heat exchanging portion 550. In the present embodiment, the heat exchanging chambers 551 are formed as two layers.

The sub-injector 38 is provided to a side wall 544 of the vaporized-fuel tank 540. The sub-injector 38 injects the liquid fuel toward the contacting wall 543.

The liquid fuel injected through the sub-injector 38 is vaporized in the vaporized-fuel chamber 541, which is heated by the heat exchanging portion 550.

A preheat pipe 560 is provided around the branch pipe 75. The preheat pipe 560 defines a preheat passage 561 therein. This preheat passage 561 communicates with the heat exchanging chamber 551 through a coolant temperature control valve 555. The coolant temperature control valve 555 permits or intercepts an outflow of the coolant from the heat exchanging chamber 551. When the coolant temperature control valve 555 is opened, the coolant in the heat exchanging chamber 551 flows into the preheat passage 561 to preheat the liquid fuel which will be supplied to the sub-injector 38. Further, the branch pipe 75 is provided with a check valve 578 which prevents a reverse flow of the liquid fuel.

A connecting end portion 546 of the vaporized-fuel pipe 60 extends vertically downwardly and is connected to the upper portion of the vaporized-fuel tank 540 in a vertical direction. Further, the vaporized-fuel tank 540 is provided with a protection wall 548 therein for preventing the liquid fuel injected through the sub-injector 38 from directly flowing into the vaporized-fuel passage 61. The protection wall 548 extends from an upper of the contacting wall 543 toward the sub-injector 38. A clearance 549 is formed between the side wall 544 and a tip end of the protection wall 548. The vaporized fuel flows into the connecting end portion 546 through the clearance 549.

A connecting end portion 547 of a return pipe 580 extends vertically upward and is connected to a vertically lower wall of the vaporized-fuel tank 540 in a vertical direction. A relief valve 585 is provided in a return passage 581 defined by a return pipe 580. The relief valve 585 is opened to connect the vaporized-fuel chamber 541 and the fuel tank 30 when the pressure in the vaporized-fuel chamber 541 exceeds a specified value, for example, a pressure of 1.5 atmospheres. The position of the relief valve 585 is detected by a detection switch 502. When the relief valve 585 is opened, the detection switch 502 is opened. The ECU 100 receives information indicative of a position of the detection switch 502. Based on this information, the ECU 100 determines whether the pressure in the vaporized-fuel chamber 541 is greater than a specified value. Specifically, when the ECU 100 detects that the detection switch 502 is opened, that is, when the ECU 100 detects that the pressure in the vaporized-fuel chamber 541 exceeds the specified value, a fuel injection through the sub-injector 38 is terminated.

A temperature sensor 501 is disposed on an inner wall 552 of the heat exchanging chamber 551. Based on the temperature detected by the temperature sensor 501, the ECU 100 estimates the temperature in the vaporized-fuel chamber 541. The preheat pipe 560 is provided with a preheat temperature sensor 511 which detects the temperature in the preheat passage 561. Based on the temperature detected by the preheat temperature sensor 511, the ECU 100 may estimate the temperature in the vaporized-fuel chamber 541.

Based on the above estimated temperature, the ECU 100 controls the coolant temperature control valve 555. Specifically, the ECU 100 controls the coolant temperature control valve 555 in such a manner that the temperature in the vaporized-fuel chamber 541 is greater than 36° C. and less than 80° C. It should be noted that the lower limit temperature 36° C. corresponds to boiling point of pentane ($C_5H_{12}$) at 1 atmospheric pressure, and the upper limit temperature 80° C. corresponds to boiling point of benzene ($C_6H_6$) at 1 atmospheric pressure. Thus, low-grade hydrocarbon (HC) of which boiling point is lower than that of pentane can be efficiently vaporized. High-grade hydrocarbon of which boiling point is higher than benzene is hardly vaporized.

As described above, the present embodiment has substantially the same advantages as the first embodiment and following advantages.

According to the present embodiment, the heat exchanging portion 550 is formed on an outer wall of the cylinder block 11. The heat exchanging portion 550 defines the heat exchanging chamber 551 therein. The vaporized-fuel tank 540 is in contact with the heat exchanging portion 550. The sub-injector 38 is provided to the side wall 544 of the vaporized-fuel tank 540. Thereby, the vaporized-fuel tank 540 can be efficiently heated by using the heat of the coolant in the heat exchanging chamber 551, so that the vaporized fuel can be efficiently generated. Further, the heat exchanging chambers 551 are formed as two layers. Thus, it is avoided that temperature in the vaporized-fuel chamber 41 is excessively increased.

Since the preheated liquid fuel can be supplied to the sub-injector 38, the vaporized fuel can be efficiently generated. By controlling the coolant temperature control valve 555, the temperature in the vaporized-fuel chamber 541 and the temperature of the liquid fuel which will be supplied to the sub-injector 38 can be adjusted to the desired values.

Especially, according to the present embodiment, the ECU 100 controls the coolant temperature control valve 555 in such a manner that the temperature in the vaporized-fuel chamber 541 is greater than 36° C. and less than 80° C. Thus, only low-grade hydrocarbon can be selectively vaporized and supplied to the combustion chamber 19 in order to reduce the emission. By vaporizing pentane, the number of gas molecules is increased so that the pressure in the vaporized-fuel chamber 541 can be increased.

Further, the vaporized-fuel tank 540 is provided with the protection wall 548 therein for preventing the liquid fuel injected through the sub-injector 38 from directly flowing into the vaporized-fuel passage 61. Thereby, it can be avoided that the liquid fuel flows into the vaporized-fuel passage 61 along with the vaporized fuel.

The position of the relief valve 585 is detected by a detection switch 502 instead of a pressure sensor. The ECU 100 receives information indicative of a position of the detection switch 502. Based on this information, the ECU 100 determines whether the pressure in the vaporized-fuel chamber 541 is greater than a specified value. Thus, the pressure in the vaporized-fuel chamber 541 can be detected without using a pressure sensor, which reduces the number of parts of the system.

[Sixth Embodiment]

Figure 9:
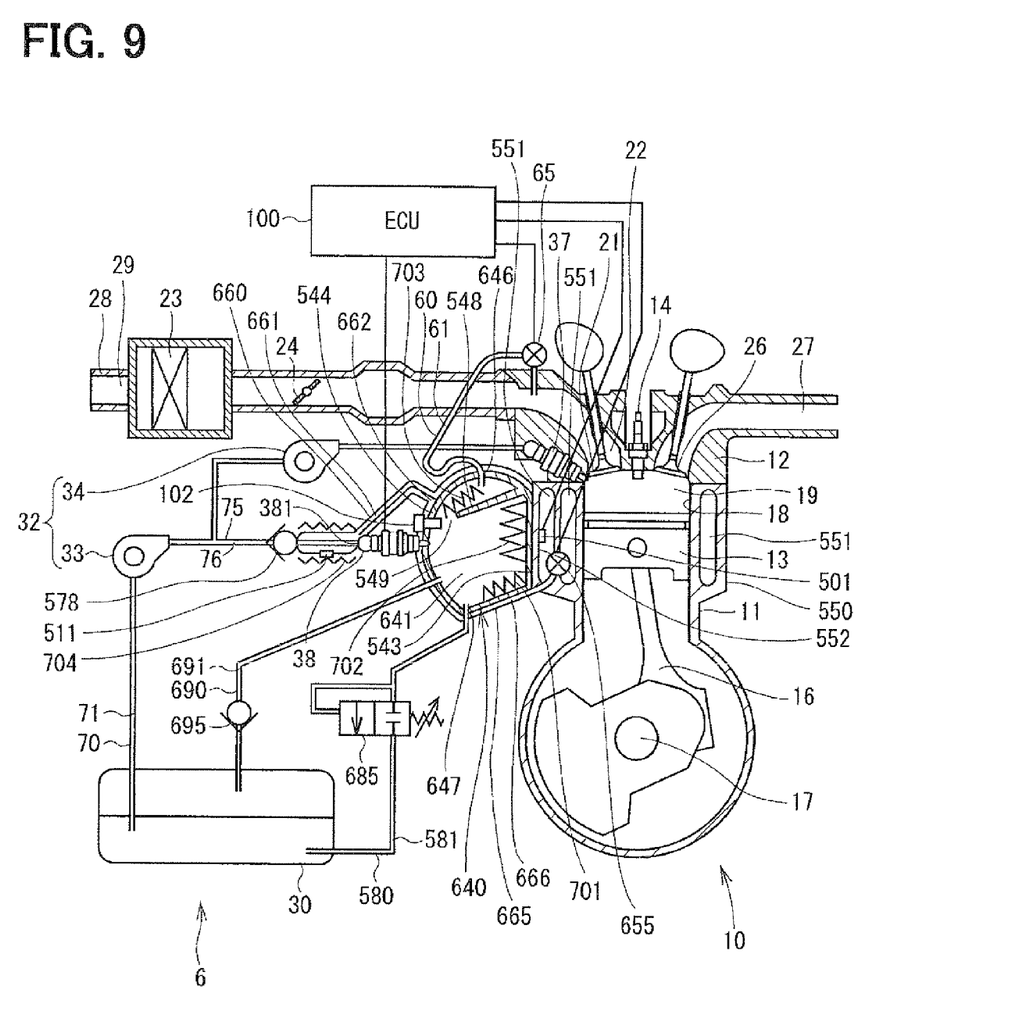
FIG. 9 is a construction diagram to show a construction of a fuel supply system according to a sixth embodiment of the present invention.

Referring to FIG. 9, a sixth embodiment of the present invention will be described hereinafter. The sixth embodiment is a modification of the fifth embodiment.

As shown in FIG. 9, the fuel supply system 6 is provided with a vaporized-fuel pipe 690 which defines a vaporized-fuel passage 691 therein. This vaporized-fuel passage 691 is for supplying the vaporized fuel generated in the fuel tank 30 to the vaporized-fuel chamber 641 of the vaporized-fuel tank 640. A check valve 695 is provided in the vaporized-fuel passage 691. Instead of the pressure detection switch 502, the pressure sensor 102 is provided in order to detect the pressure in the vaporized-fuel chamber 641 as well as the first embodiment.

A thermal insulator 665 is disposed on an outer surface of the vaporized-fuel tank 640. A thermal insulating passage 666 is defined between the outer surface of the vaporized-fuel tank 640 and the thermal insulator 665. This thermal insulating passage 666 communicates with the heat exchanging chamber 551 through the coolant temperature control valve 655. The preheat passage 661 communicates with the thermal insulating passage 666 at a connecting portion 662. When the coolant temperature control valve 655 is opened, the preheat passage 661 communicates with the heat exchanging chamber 551 through the thermal insulating passage 666.

According to the present embodiment, the fuel supply system 6 is provided with heaters 701-704. A first heater 701 is disposed on an inner bottom wall of the vaporized-fuel tank 640. The first heater 701 heats the liquefied fuel at the bottom of the vaporized-fuel tank 640 in order to vaporize the liquefied fuel. A second heater 702 is provided on the contacting wall 543 of the vaporized-fuel tank 640. The second heater 702 facilitates a vaporization of the fuel injected through the sub-injector 38. The second heater 702 is shaped wavy.

A third heater 703 is disposed on an inner upper wall of the vaporized-fuel tank 640. The third heater 703 heats the vaporized fuel so that the fuel is changed from wet vapor to superheated vapor. A preheat heater 704 is provided on a preheat pipe 660 to heat the liquid fuel which will be supplied to the sub-injector 38.

The ECU 100 controls ON-OFF of the above heaters 701-704. Based on the detection signals of the temperature sensors 501, 511 and the pressure sensor 102, the ECU 100 controls the heaters 701-704 and the coolant temperature control valve 655 in such a manner that the temperature in the vaporized-fuel chamber 641 is greater than the boiling point of pentane and lower than the boiling point of benzene.

After the engine is shut down, the temperature in the vaporized-fuel chamber 641 gradually decreases. When the temperature becomes lower than 36° C., hydrocarbon of which boiling point is higher than pentane is liquefied. Thereby, the pressure in the vaporized-fuel chamber 641 decreases. The ECU 100 controls the return valve 685 in such a manner that the pressure in the vaporized-fuel chamber 641 decreases along with a decrease in engine temperature. The vaporized fuel can be liquefied in the vaporized-fuel chamber 641 for successive cold start of engine. When the pressure in the vaporized-fuel chamber 641 becomes lower than the atmospheric pressure, it is desirable that gas containing the vaporized fuel is supplied to the vaporized-fuel chamber 641 through the vaporized-fuel passage 691 and the check valve 695.

The heaters 701-704 can be energized even when the engine 10 is shut off. Before the engine is started from a cold-start condition, the heaters 701-704 are controlled so that the temperature in the vaporized-fuel chamber 641 is greater than the boiling point of pentane and less than the boiling point of benzene.

Furthermore, the first heater 701 may heat the vaporized fuel to be greater than the boiling point of the benzene or greater than 80° C., so that the hydrocarbon is superheated to rapidly increase the pressure in the vaporized-fuel chamber 641.

It is preferable that the energization start timing of the heaters 701-704 is set to timing before the engine 10 is started and a sufficient time period is ensured to increase the temperature in the vaporized-fuel chamber 641 to a desired temperature.

As described above, the present embodiment has substantially the same advantages as the fifth embodiment and following advantages. A thermal insulator 665 is disposed on an outer surface of the vaporized-fuel tank 640. The thermal insulating passage 666 is defined between the thermal insulator 665 and the vaporized-fuel tank 640. Since the vaporized-fuel tank 640 always receives heat, the liquid fuel in the vaporized-fuel tank 640 is facilitated to be vaporized. The vaporized fuel is hardly liquefied.

The vaporized-fuel tank 640 has the first heater 701, the second heater 702 and the third heater 703 therein. Thus, the vaporization of the liquid fuel in the vaporized-fuel tank 640 is accelerated. The first heater 701 vaporizes the liquid fuel in the communication passage 647, so that the pressure in the vaporized-fuel chamber 641 is increased. Further, the third heater 703 heats the vaporized fuel so that the fuel is changed from wet vapor to superheated vapor. Thus, condensation of the vaporized fuel which will be supplied to the vaporized-fuel passage 61 can be avoided. The second heater 702 efficiently vaporizes the liquid fuel injected through the sub-injector 38. Since the second heater 702 is wavy-shaped, heat exchange efficiency is improved so that a generation of the vaporized fuel is accelerated. The contact surface 643 of the vaporized-fuel tank 640 can be shaped wavy. The preheat heater 704 previously heats the liquid fuel which will be supplied to the sub-injector 38, so that the vaporized fuel is efficiently generated.

The heaters 701-704 can be energized without respect to the driving condition of the engine 10. Before the engine 10 is started, the heaters 701-704 can be energized to supply the vaporized fuel.

Further, the heaters 701-704 and the temperature control valve 655 are controlled in such a manner that the temperature in the vaporized-fuel chamber 641 is greater than the boiling point of pentane and lower than the boiling point of benzene. Thus, only low-grade hydrocarbon can be selectively vaporized and supplied to the combustion chamber 19 in order to reduce the emission. Especially, at a cold-start of the engine 10, pentane is vaporized to increase the pressure in the vaporized-fuel chamber 641.

Furthermore, at the cold-start of the engine, the first heater 701 may heat the vaporized fuel to be greater than the boiling point of the benzene or greater than 80° C., so that the low-grade hydrocarbon is superheated to rapidly increase the pressure in the vaporized-fuel chamber 641.

[Other Embodiment]

The present invention can be applied to an intake port injection gasoline engine.

The vaporized-fuel tank can be disposed adjacent to an EGR pipe, an EGR cooler, or an exhaust pipe to receive heat therefrom. In a case that the vaporized-fuel tank is provided with heaters, the vaporized-fuel tank can be disposed at any place.

The above embodiments can be suitably combined.

The present invention is not limited to the embodiments mentioned above, and can be applied to various embodiments.

What is claimed is:
1. A fuel supply system comprising:
a fuel tank storing a liquid fuel therein;
a pump suctioning and feeding the liquid fuel stored in the fuel tank;
a first injector injecting the liquid fuel supplied from the pump into a combustion chamber or an intake passage of an internal combustion engine;

a second injector injecting the liquid fuel supplied from the pump into vaporized-fuel chamber to generate a vaporized fuel therein;

a vaporized-fuel tank defining the vaporized-fuel chamber for storing the vaporized-fuel generated by an injection of the second injector, wherein the vaporized-fuel tank is heated by a heating means and the vaporized-fuel tank is heated by a combustion heat generated in the combustion chamber due to a fuel combustion;

a vaporized-fuel pipe defining vaporized-fuel passage which introduces the vaporized fuel stored in the vaporized-fuel tank into the intake passage;

a purge valve provided in the vaporized-fuel passage for selectively switching a communication between the vaporized-fuel chamber and the intake passage;

a control unit having a first injection control means for controlling a fuel injection through the first injector, a second injection control means for controlling a fuel injection through the second injector, and a purge valve control means for controlling a switching operation of the purge valve;

a heat exchanging portion disposed on the cylinder block and defining a heat exchanging chamber through which a circulation fluid circulates in order to heat-exchange with the cylinder block, wherein the vaporized-fuel tank is in contact with the heat exchanging portion; and a preheat pipe defining a preheat passage around the fuel supply pipe which introduces the liquid fuel to the second injector, wherein the circulation fluid circulates through the preheat passage.

2. A fuel supply system comprising:

a fuel tank storing a liquid fuel therein;

a pump suctioning and feeding the liquid fuel stored in the fuel tank;

a first injector injecting the liquid fuel supplied from the pump into a combustion chamber or an intake passage of an internal combustion engine;

a second injector injecting the liquid fuel supplied from the pump into a vaporized-fuel chamber to generate a vaporized fuel therein;

a vaporized-fuel tank defining the vaporized-fuel chamber for storing the vaporized fuel generated by an injection of the second injector;

vaporized-fuel pipe defining a vaporized-fuel passage which introduces the vaporized fuel stored in the vaporized-fuel tank into the intake passage;

a purge valve provided in the vaporized-fuel passage for selectively switching a communication between the vaporized-fuel chamber and the intake passage; and a control unit having a first injection control means for controlling a fuel injection through the first injector, a second injection control means for controlling a fuel injection through the second injector, and a purge valve control means for controlling switching operation of the purge valve, wherein the control unit includes a concentration computing means for computing a concentration of the vaporized fuel in the vaporized-fuel chamber, and a coefficient computing means for computing a reduction coefficient based on the computed concentration of the vaporized fuel, the first injection control means reduces a fuel injection quantity through the first injector based on the reduction coefficient.

* * * * *